US012695561B2

(12) United States Patent
Fan et al.

(10) Patent No.: US 12,695,561 B2
(45) Date of Patent: Jul. 28, 2026

(54) METHOD AND APPARATUS FOR MULTICAST COMMUNICATION

(71) Applicant: Telefonaktiebolaget LM Ericsson (publ), Stockholm (SE)

(72) Inventors: Rui Fan, Beijing (CN); Stefan Parkvall, Bromma (SE); Zhi Ge, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 642 days.

(21) Appl. No.: 18/013,313

(22) PCT Filed: Jun. 23, 2021

(86) PCT No.: PCT/CN2021/101859
§ 371 (c)(1),
(2) Date: Dec. 28, 2022

(87) PCT Pub. No.: WO2022/001790
PCT Pub. Date: Jan. 6, 2022

(65) Prior Publication Data
US 2023/0246761 A1 Aug. 3, 2023

(30) Foreign Application Priority Data

Jun. 30, 2020 (WO) ................ PCT/CN2020/099364

(51) Int. Cl.
*H04W 72/04* (2023.01)
*H04L 1/1829* (2023.01)
(Continued)

(52) U.S. Cl.
CPC .......... *H04L 5/0044* (2013.01); *H04L 1/1854* (2013.01); *H04L 5/0055* (2013.01); *H04W 72/1263* (2013.01)

(58) Field of Classification Search
CPC ... H04L 5/0044; H04L 5/0055; H04L 5/0037; H04L 5/0053; H04L 5/0094;
(Continued)

(56) References Cited

U.S. PATENT DOCUMENTS 12,295,016 B2 * 5/2025 Matsumura ........... H04L 5/0076
2013/0039307 A1 2/2013 Han et al.
(Continued)

FOREIGN PATENT DOCUMENTS

CN 101940046 A 1/2011
CN 109964434 A 7/2019
(Continued)

OTHER PUBLICATIONS

Examination Report for Indian Patent Application No. 202217068443, mailed Mar. 21, 2024, 6 pages.
(Continued)

*Primary Examiner* — Mahbubul Bar Chowdhury
(74) *Attorney, Agent, or Firm* — Withrow & Terranova, PLLC

(57) ABSTRACT

Various embodiments of the present disclosure provide a method for multicast communication. The method which may be performed by a terminal device comprises receiving an uplink resource indicator for a multicast traffic of the terminal device from a network node. The uplink resource indicator may be used to indicate different uplink resources for multicast feedback of different terminal devices in a multicast group receiving the multicast traffic. The method further comprises determining an uplink resource for multicast feedback of the terminal device for the multicast traffic, according to the uplink resource indicator. In accordance with various embodiments of the present disclosure,
(Continued)

hybrid automatic repeat request feedback may be implemented efficiently and flexibly for different traffics such as multicast and unicast traffics.

15 Claims, 12 Drawing Sheets

(51) Int. Cl.
  *H04L 5/00* (2006.01)
  *H04W 72/1263* (2023.01)
(58) Field of Classification Search
  CPC ......... H04L 1/1854; H04L 2001/0093; H04W 72/1263; H04W 72/30
  See application file for complete search history.

(56) References Cited

U.S. PATENT DOCUMENTS

| | | | |
|---|---|---|---|
| 2013/0301600 A1 | 11/2013 | Park | |
| 2014/0226552 A1* | 8/2014 | Niu | H04W 4/06 |
| | | | 370/312 |
| 2014/0355493 A1 | 12/2014 | Niu et al. | |
| 2020/0106567 A1 | 4/2020 | Bharadwaj et al. | |
| 2021/0014647 A1* | 1/2021 | Takeda | H04W 72/21 |
| 2023/0050170 A1* | 2/2023 | Wang | H04L 1/1854 |
| 2023/0082646 A1* | 3/2023 | Gou | H04W 72/30 |
| | | | 370/329 |
| 2023/0095951 A1* | 3/2023 | Lu | H04L 1/1864 |
| | | | 370/312 |
| 2023/0124015 A1* | 4/2023 | Matsumura | H04W 72/231 |
| | | | 370/329 |

FOREIGN PATENT DOCUMENTS

| | | | | | |
|---|---|---|---|---|---|
| CN | 111294159 | A | 6/2020 | | |
| CN | 113692048 | A | 11/2021 | | |
| WO | 2018137129 | A1 | 8/2018 | | |
| WO | 2020063665 | A1 | 4/2020 | | |
| WO | 2020108333 | A1 | 6/2020 | | |
| WO | WO-2020125990 | A1 * | 6/2020 | .......... | H04L 1/1861 |
| WO | 2021071702 | A1 | 4/2021 | | |
| WO | 2021138099 | A1 | 7/2021 | | |
| WO | 2021192299 | A1 | 9/2021 | | |

OTHER PUBLICATIONS

Extended European Search Report for European Patent Application No. 21834242.6, mailed May 23, 2024, 9 pages.

Ericsson, "TDoc R2-1817957: on the Support of HARQ/CSI feedbacks Over Sidelink," 3GPP TSG-RAN WG2 #104, Nov. 12-16, 2018, Spokane, Washington, 4 pages.

International Search Report and Written Opinion for International Patent Application No. PCT/CN2021/101859, mailed Sep. 13, 2021, 10 pages.

Notice of Reasons for Refusal for Japanese Patent Application No. 2022-575472, mailed Oct. 30, 2023, 6 pages.

Ericsson, "R1-1912708: UL signals and channels for NR-U," 3GPP TSG-RAN WG1 Meeting #99, Nov. 18-22, 2019, Reno, Nevada, 28 pages.

First Office Action for Chinese Patent Application No. 202180045829.1, mailed Sep. 4, 2025, 28 pages.

* cited by examiner

BEGIN

1010
Host computer provides user data

1020
Host computer initiates transmission carrying the user data to the UE

1030
UE receives the user data

END

METHOD AND APPARATUS FOR MULTICAST COMMUNICATION

This application is a 35 U.S.C. § 371 national phase filing of International Application No. PCT/CN2021/101859, filed Jun. 23, 2021, which claims the benefit of International Application No. PCT/CN2020/099364, filed Jun. 30, 2020, the disclosures of which are incorporated herein by reference in their entireties.

FIELD OF THE INVENTION

The present disclosure generally relates to communication networks, and more specifically, to a method and apparatus for multicast communication.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, a wireless communication network, such as a long term evolution (LTE)/fourth generation (4G) network or a new radio (NR)/fifth generation (5G) network are expected to achieve high traffic capacity and end-user data rate. In order to meet different traffic requirements, the wireless communication network may be supposed to support various transmission technologies, for example, including but not limited to unicast transmission, multicast transmission, broadcast transmission, etc. For a transmitter, it may be desirable to get feedback information from a receiver to indicate whether the traffic data transmitted by the transmitter are received by the receiver successfully. Considering the diversity of transmission technologies and application scenarios, the feedback transmissions may become more challenging.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Multicast/broadcast transmission may be very useful for some applications, for example, network security public safety (NSPS), vehicle-to-everything (V2X), etc. For these applications, there may be a requirement on quality of service (QoS), e.g. less than 1% packet error rate with a delay budget of several milliseconds. Therefore, it may be beneficial to support hybrid automatic repeat request (HARQ) feedback for multicast services in a wireless communication network such as 5G/NR to improve spectral efficiency.

Various exemplary embodiments of the present disclosure propose a solution for multicast communication, which may enable an uplink resource indicator/index (e.g. an acknowledgement resource indicator (ARI), etc.) for all user equipments (UEs) in a multicast group to point to different uplink resources (e.g., physical uplink control channel (PUCCH)

resources, etc.), so that the UEs in the multicast group may use different uplink resources to send multicast HARQ feedback efficiently without confliction among the UEs in the multicast group.

It can be appreciated that the term "resource" described in this document may refer to time resource and/or frequency resource and/or code resource, and thus "different resources" described in this document may mean that at least one of time resource, frequency resource and code resource is different.

According to a first aspect of the present disclosure, there is provided a method performed by a terminal device such as a UE. The method comprises receiving an uplink resource indicator for a multicast traffic of the terminal device from a network node. The uplink resource indicator may be used to indicate different uplink resources (e.g., PUCCH resources, etc.) for multicast feedback of different terminal devices in a multicast group receiving the multicast traffic. In accordance with an exemplary embodiment, the method further comprises determining an uplink resource for multicast feedback of the terminal device for the multicast traffic, according to the uplink resource indicator.

In accordance with an exemplary embodiment, the different uplink resources indicated by the uplink resource indicator may be at least part of a set of uplink control channel resources (e.g., a set of PUCCH resources, etc.). The set of uplink control channel resources may be shared by the different terminal devices in the multicast group.

In accordance with an exemplary embodiment, the set of uplink control channel resources may have indexes per resource, and different indexes may be assigned to the same resource in the set of uplink control channel resources with respect to the different terminal devices in the multicast group.

In accordance with an exemplary embodiment, the method according to the first aspect of the present disclosure may further comprise: obtaining information about the set of uplink control channel resources to indicate indexes assigned to the set of uplink control channel resources with respect to the terminal device.

In accordance with an exemplary embodiment, the information about the set of uplink control channel resources may be included in radio resource control (RRC) signaling from the network node.

In accordance with an exemplary embodiment, the set of uplink control channel resources may also be available for unicast feedback transmission.

In accordance with an exemplary embodiment, the uplink resource indicator may be reserved for the multicast traffic.

In accordance with an exemplary embodiment, the uplink resource indicator may be an ARI included in a downlink control channel for the multicast traffic. In an embodiment, the ARI may be included in a physical downlink control channel (PDCCH), for example, as a part of downlink control information (DCI).

In accordance with an exemplary embodiment, the method according to the first aspect of the present disclosure may further comprise: transmitting the multicast feedback of the terminal device to the network node, according to the determined uplink resource.

According to a second aspect of the present disclosure, there is provided an apparatus which may be implemented as a terminal device. The apparatus may comprise one or more processors and one or more memories storing computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a terminal device. The apparatus may comprise a receiving unit and a determining unit. In accordance with some exemplary embodiments, the receiving unit may be operable to carry out at least the receiving step of the method according to the first aspect of the present disclosure. The determining unit may be operable to carry out at least the determining step of the method according to the first aspect of the present disclosure.

According to a fifth aspect of the present disclosure, there is provided a method performed by a network node such as a base station. The method comprises transmitting an uplink resource indicator (e.g. an ARI in a multicast PDCCH, etc.) for a multicast traffic of the terminal device to the terminal device. The uplink resource indicator may be used to indicate different uplink resources for multicast feedback of different terminal devices in a multicast group receiving the multicast traffic. In accordance with an exemplary embodiment, the method further comprises receiving multicast feedback of the terminal device for the multicast traffic from the terminal device, according to an uplink resource indicated to the terminal device by the uplink resource indicator.

In accordance with some exemplary embodiments, the uplink resource indicator according to the fifth aspect of the present disclosure may correspond to the uplink resource indicator according to the first aspect of the present disclosure. Thus, the uplink resource indicator according to the first and fifth aspects of the present disclosure may have the same or similar contents and/or feature elements. Similarly, the uplink resource(s) indicated by the uplink resource indicator according to the fifth aspect of the present disclosure may correspond to the uplink resource(s) indicated by the uplink resource indicator according to the first aspect of the present disclosure.

In accordance with an exemplary embodiment, the method according to the fifth aspect of the present disclosure may further comprise: transmitting information about the set of uplink control channel resources to the terminal device to indicate indexes assigned to the set of uplink control channel resources with respect to the terminal device.

According to a sixth aspect of the present disclosure, there is provided an apparatus which may be implemented as a network node. The apparatus may comprise one or more processors and one or more memories storing computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a network node. The apparatus may comprise a transmitting unit and a receiving unit. In accordance with some exemplary embodiments, the transmitting unit may be operable to carry out at least the transmitting step of the method according to the fifth aspect of the present disclosure. The receiving unit may be operable to carry out at least the receiving step of the method according to the fifth aspect of the present disclosure.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which:

Figure 1A:
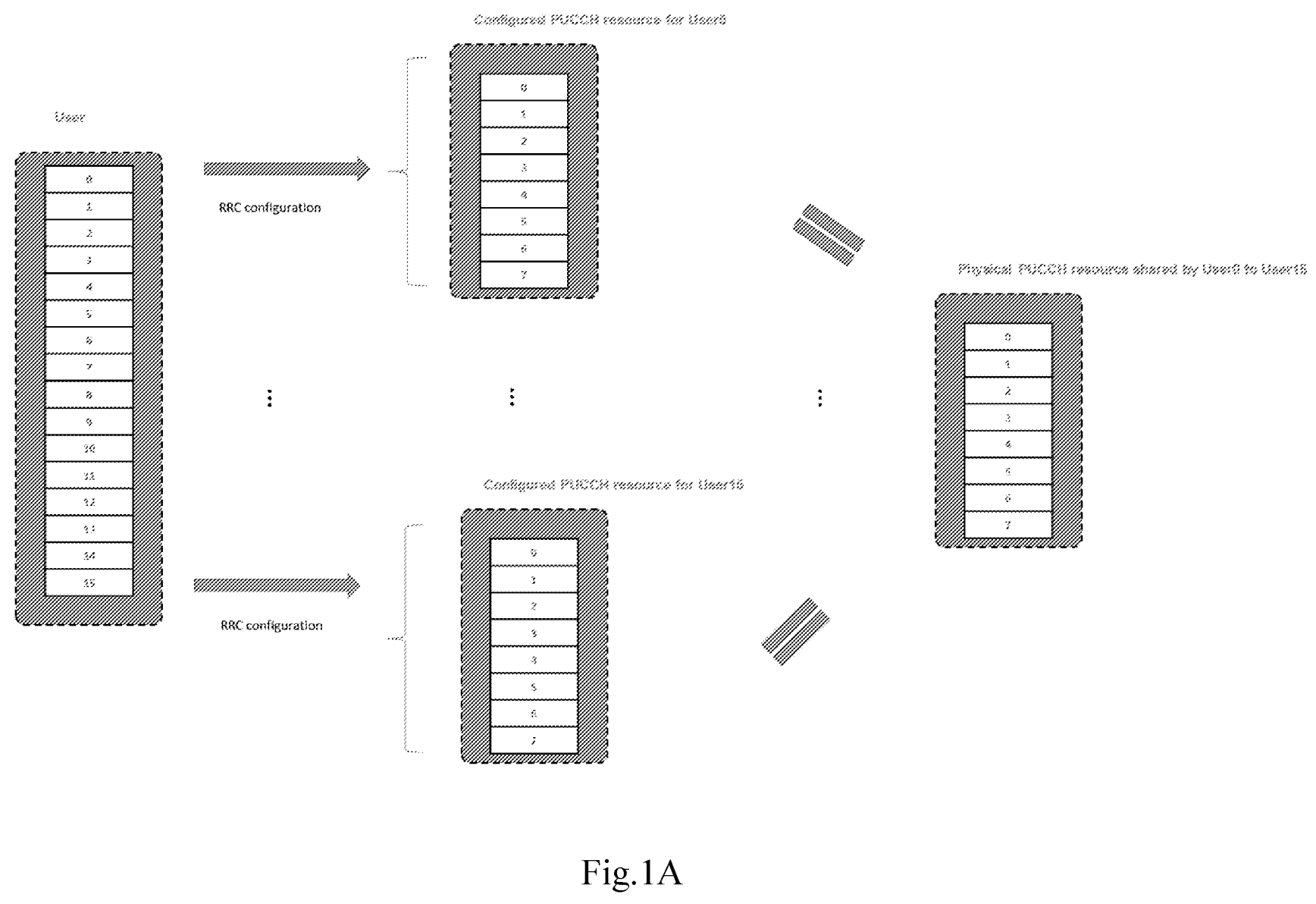

FIG. 1A is a diagram illustrating exemplary PUCCH resource configuration according to an embodiment of the present disclosure;

DETAILED DESCRIPTION

Figure 1B:
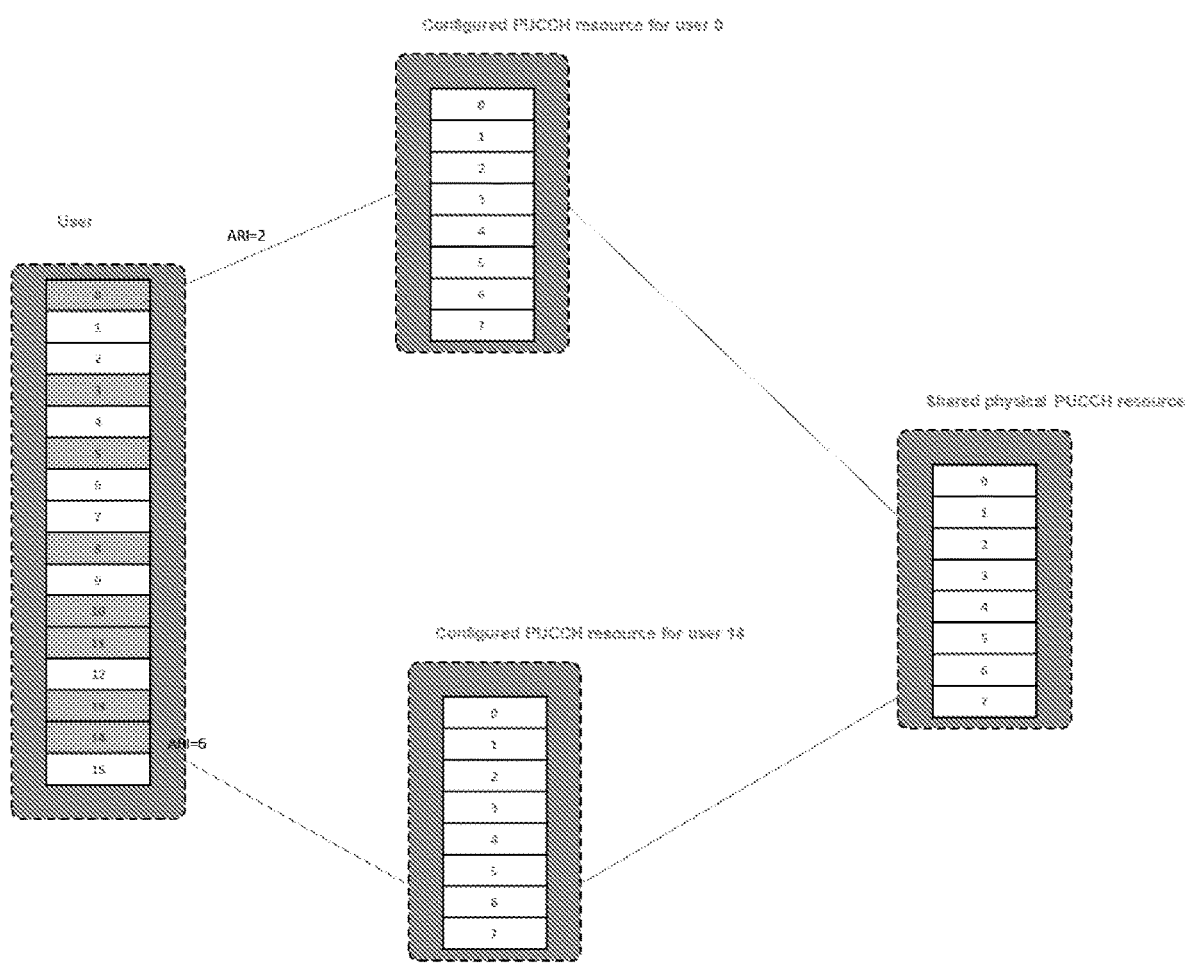
FIG. 1B is a diagram illustrating exemplary PUCCH resource allocation for unicast feedback according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multistandard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. According to 3GPP Release 15 and Release 16, only unicast transmission is supported in the 5G/NR communication system. Since multicast/broadcast transmission may be very useful for some applications, e.g. NSPS, V2X, etc., a new work item (WI) is agreed to study broadcast/multicast transmission in 3GPP Release 17 for NR.

Actually multicast/broadcast may be supported in a LTE network. There may be two different ways to support multicast/broadcast, i.e. single-cell point-to-multipoint (SC-PTM) or multimedia broadcast multicast service (MBMS). These approaches do not support HARQ feedback from a UE to the network. The advantage of such implementation is simplicity. The disadvantage is that the spectrum efficiency is very low. This is because the network does not know if the UE receives a packet or not. In order to ensure reliability, the network may have to use very low coding rate and may also repeat the transmission of the packet for several times.

In order to conquer this issue, it is proposed for NR to enable HARQ feedback for multicast transmission. For unicast transmission in NR, in order to utilize the PUCCH resource more efficiently, multiple UEs may share the same group of PUCCH resources, e.g. in a resource pool. A UE can determine to use which resource in the resource pool by checking a PUCCH resource indicator (e.g. an ARI, etc.) in DCI. Generally, the network may inform each UE of a PUCCH resource indicator, and different PUCCH resource indicators for different UEs may refer to different physical PUCCH resources. Then each UE may use a PUCCH resource different from others to send HARQ feedback to the network. Therefore, there may be no resource confliction issue between multiple UEs even they share the same group of PUCCH resources.

FIG. 1A is a diagram illustrating exemplary PUCCH resource configuration according to an embodiment of the present disclosure. In this embodiment, multiple UEs may dynamically share a pool of PUCCH resources for unicast transmission. As shown in FIG. 1A, a pool of PUCCH resources including physical PUCCH resources with indexes from 0 to 7 may be configured for each UE, e.g. via radio resource control (RRC) configuration. In this case, 16 UEs (i.e. from User 0 to User 15) may share the same group of PUCCH resources. This may be based on the traffic load situation that not all UEs need to be scheduled for downlink (DL) transmission within the same time slot and thus require feedback at the same uplink (UL) slot. It can be appreciated that the PUCCH resource configuration shown in FIG. 1A is just an example, and other possible PUCCH resource configuration involving more or less users and/or physical PUCCH resources may also be implemented for various embodiments.

FIG. 1B is a diagram illustrating exemplary PUCCH resource allocation for unicast feedback according to an embodiment of the present disclosure. Similar to FIG. 1A, 16 UEs shown in FIG. 1B may share 8 physical PUCCH resources in a PUCCH resource pool for unicast transmission. When there are several UEs need to be scheduled in DL and feedback at the same UL slot, a PUCCH resource indicator in a PDCCH, e.g. an ARI in DCI, may be used to tell a UE which specific PUCCH resource within the PUCCH resource pool may be used. This PUCCH resource indicator may be different for each UE, so that different UEs may use different PUCCH resources. For example, an ARI for User 0 may be set to 2 to indicate that User 0 may use PUCCH resource with index "2", while an ARI for User 14 may be set to 6 to indicate that User 14 may use PUCCH resource with index "6", as shown in FIG. 1B.

In multicast traffic scheduling, there may be just one PDCCH which is received by all UEs in a multicast group. Since one PDCCH may be used to schedule a group of UEs for multicast transmission, there may be only one PUCCH resource indicator such as ARI in the PDCCH. According to current implementation, one ARI in DCI may only point to one physical PUCCH resource. In this case, if all UEs in the multicast group share the same group of PUCCH resources, then apparently, as all UEs in the multicast group may need to send HARQ feedback in UL, these UEs may choose the same PUCCH resource to send the HARQ feedback. This may result in a confliction issue among the UEs in the multicast group.

Various exemplary embodiments of the present disclosure propose a solution to support multicast transmission, which may enable multicast and/or unicast HARQ feedback resource sharing without confliction for users in a multicast group. In order to support HARQ feedback for multicast transmission in a wireless communication network such as 5G/NR, all users in a multicast group may need to have different PUCCH resources so that all of them can send HARQ feedback in the same time without confliction. In accordance with an exemplary embodiment, a gNB may configure a PUCCH resource pool which may be shared by all UEs in a multicast group. For different UEs in the multicast group, the same PUCCH resource index may point to different physical PUCCH resources in the PUCCH resource pool. In this case, even there may be just one ARI in a multicast PDCCH, as the same ARI may point to different physical PUCCH resources, all UEs in the multicast group may actually use different PUCCH resources to transmit HARQ feedback information. Therefore, there may be no resource confliction issue to send HARQ feedback among the UEs in the multicast group. In accordance with another exemplary embodiment, these PUCCH resources may be shared between HARQ feedback for unicast and multicast traffics.

Figure 2A:
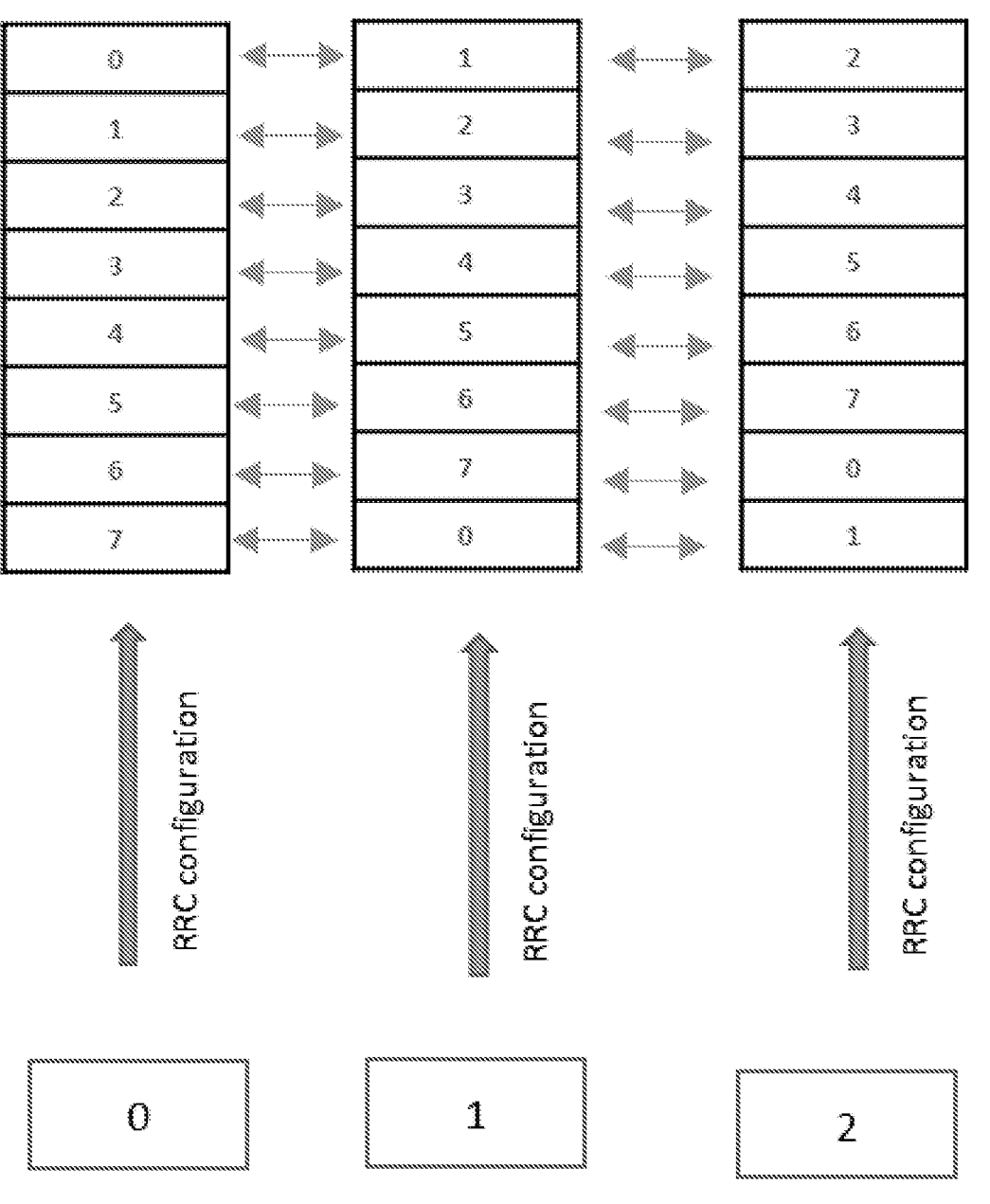
FIG. 2A is a diagram illustrating exemplary smart PUCCH resource configuration according to an embodiment of the present disclosure.

FIG. 2A is a diagram illustrating exemplary smart PUCCH resource configuration according to an embodiment of the present disclosure. In this embodiment, it may be possible to implement smart PUCCH resource configuration for users in a multicast group, e.g. through RRC configuration, so that the ARIs received by different users in the multicast group may point to different physical PUCCH resources. As shown in FIG. 2A, User 0, User 1 and User 2 are in a multicast group and they may share the same PUCCH resource pool with 8 PUCCH resources. For User 0, the first physical PUCCH resource is with index 0, the second physical PUCCH resource is with index 1, . . . , and the last physical PUCCH resource is with index 7. For User 1, the first physical PUCCH resource is with indexed 1, the second physical PUCCH resource is with index 2, . . . , and the last physical PUCCH resource is with index 0. That is to say, the physical PUCCH resource with index 1 for User 1 actually corresponds to the same physical PUCCH resource with index 0 for User 0. For User 2, the first physical PUCCH resource is with index 2, the second physical PUCCH resource is with index 3, . . . , and the last physical PUCCH resource is with index 1. That is to say, the physical PUCCH resource with index 2 for User 2 actually corresponds to the same physical PUCCH resource with index 1 for User 1, and also corresponds to the same physical PUCCH resource with index 0 for User 0. There may be similar corresponding relationship for other physical PUCCH resources. This kind of PUCCH resource configuration may give a gNB the maximum flexibility during scheduling, as any ARI in a multicast PDCCH may not result in a PUCCH resource confliction for the users in the multicast group.

It can be appreciated that the smart PUCCH resource configuration as shown in FIG. 2A is just an example, and other suitable PUCCH resource configuration which can enable the same ARI in the multicast PDCCH to point to different physical PUCCH resources for different users in the multicast group may also be applicable to various embodiments of the present disclosure.

Figure 2B:
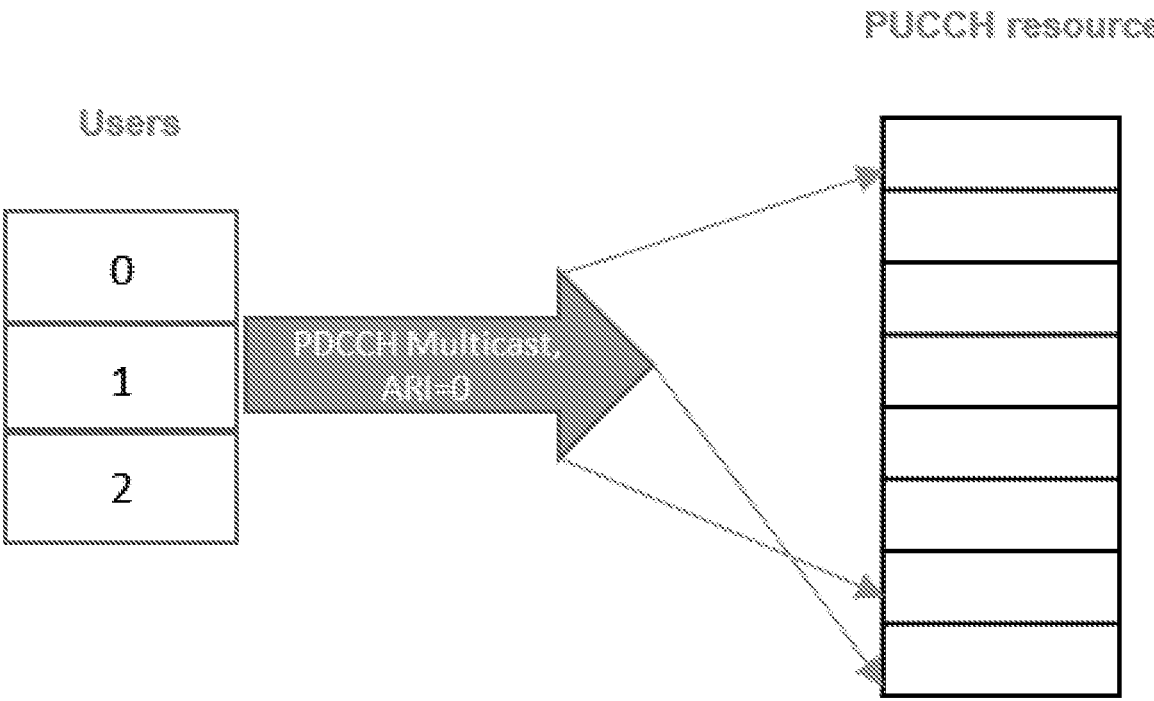
FIG. 2B is a diagram illustrating exemplary PUCCH resource allocation for multicast feedback according to an embodiment of the present disclosure.

FIG. 2B is a diagram illustrating exemplary PUCCH resource allocation for multicast feedback according to an embodiment of the present disclosure. The exemplary PUCCH resource allocation shown in FIG. 2B may be based on the smart PUCCH resource configuration as described with respect to FIG. 2A. According to an exemplary embodiment, it may be feasible to just configure one ARI for all users in the multicast group to point to different physical PUCCH resources. Then when a multicast traffic is scheduled for User 0, User 1 and User 2, although there is only one ARI (e.g. ARI=0) in the multicast PDCCH, this ARI may actually point to different physical resources from different user perspective, as shown in FIG. 2B. Since the PUCCH resource indicator (e.g. ARI) for each user in the multicast group may be configured to point to different physical PUCCH resources, the PUCCH resource confliction issue for users in the multicast group may be solved. In accordance with an exemplary embodiment, the gNB may reserve an ARI for multicast scheduling. In this case, the ARI reserved for the multicast scheduling may not be used in a unicast PDCCH.

It is noted that some embodiments of the present disclosure are mainly described in relation to 4G/LTE or 5G/NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 3:
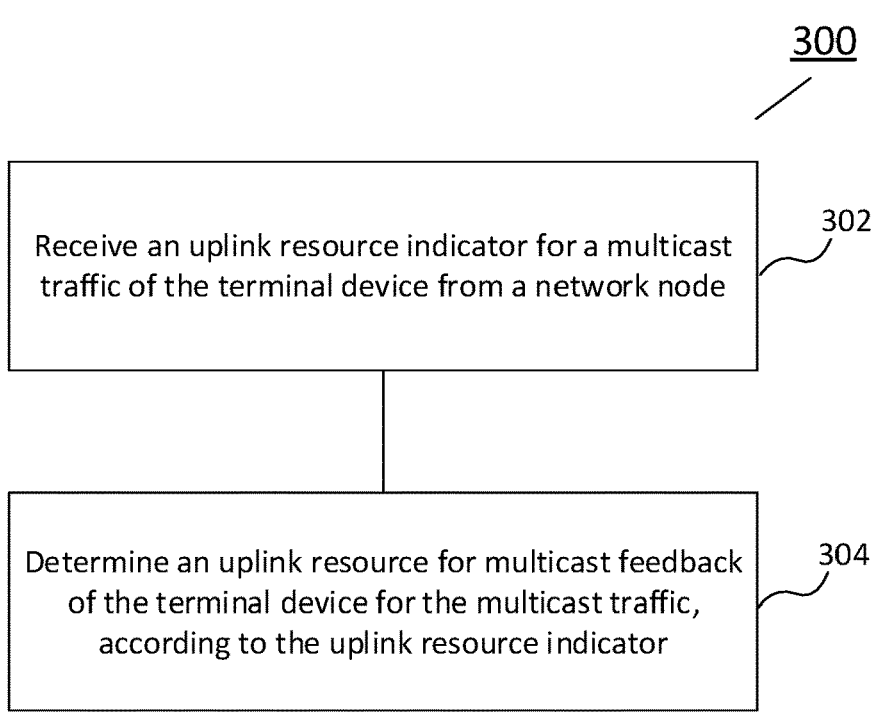
FIG. 3 is a flowchart illustrating a method according to an embodiment of the present disclosure.

FIG. 3 is a flowchart illustrating a method 300 according to some embodiments of the present disclosure. The method 300 illustrated in FIG. 3 may be performed by a terminal device or an apparatus communicatively coupled to the terminal device. In accordance with an exemplary embodiment, the terminal device such as a UE may be configured to get various traffics (e.g., a unicast traffic, a multicast traffic, etc.) from a network node such as a gNB, and send HARQ feedback for the traffics to the network node.

According to the exemplary method 300 illustrated in FIG. 3, the terminal device may receive an uplink resource indicator for a multicast traffic of the terminal device from a network node, as shown in block 302. The uplink resource indicator may be used to indicate different uplink resources (e.g., PUCCH resources, etc.) for multicast feedback of different terminal devices in a multicast group receiving the multicast traffic. In accordance with an exemplary embodiment, the uplink resource indicator may be an ARI included in a downlink control channel (e.g. PDCCH, etc.) for the multicast traffic. According to the uplink resource indicator, the terminal device may determine an uplink resource for multicast feedback of the terminal device for the multicast traffic, as shown in block 304.

In accordance with an exemplary embodiment, the different uplink resources indicated by the uplink resource indicator may be at least part of a set of uplink control channel resources which may be sharable by the different terminal devices in the multicast group (as described with respect to FIG. 2B).

In accordance with an exemplary embodiment, the set of uplink control channel resources may have indexes per resource, and different indexes may be assigned to the same resource in the set of uplink control channel resources with respect to the different terminal devices in the multicast group (as described with respect to FIG. 2A).

In accordance with an exemplary embodiment, the terminal device may obtain information about the set of uplink control channel resources to indicate indexes assigned to the set of uplink control channel resources with respect to the terminal device. In an embodiment, the information about the set of uplink control channel resources may be included in RRC signaling from the network node.

In accordance with an exemplary embodiment, the set of uplink control channel resources may also be available for unicast feedback transmission. In this case, the terminal device may use a part of the set of uplink control channel resources to transmit the unicast feedback to the network node, while using another part of the set of uplink control channel resources to transmit the multicast feedback to the network node.

In accordance with an exemplary embodiment, the uplink resource indicator may be reserved for the multicast traffic. In an embodiment, the uplink resource indicator reserved for the multicast traffic may not be used to indicate the uplink resource(s) allocated to the unicast feedback transmission.

In accordance with an exemplary embodiment, the terminal device may transmit the multicast feedback of the terminal device to the network node, according to the determined uplink resource. For example, the terminal device may use the determined uplink resource to transmit the multicast feedback in a specific codebook to the network node.

Figure 4:
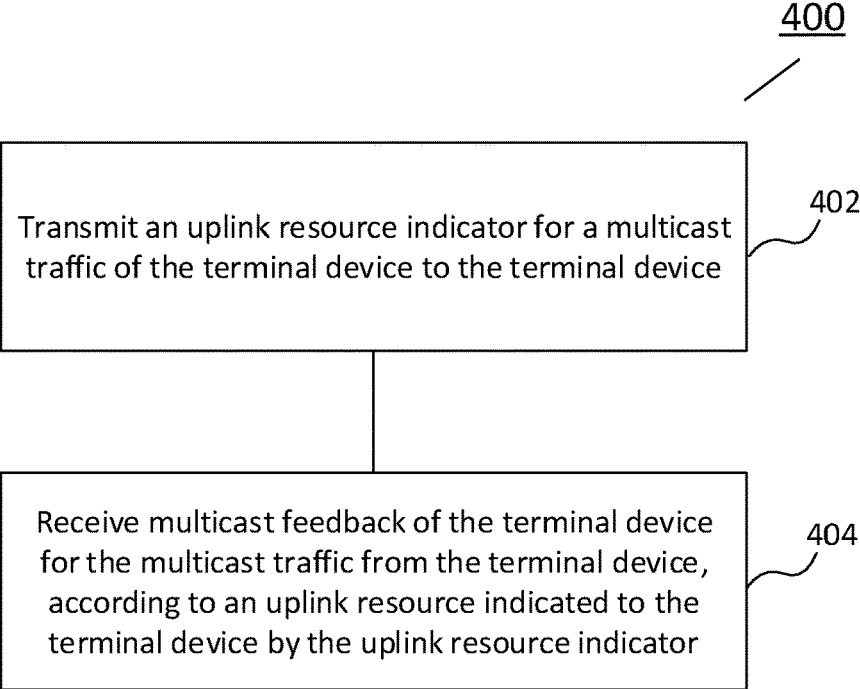
FIG. 4 is a flowchart illustrating another method according to an embodiment of the present disclosure.

FIG. 4 is a flowchart illustrating a method 400 according to some embodiments of the present disclosure. The method 400 illustrated in FIG. 4 may be performed by a network node or an apparatus communicatively coupled to the network node. In accordance with an exemplary embodiment, the network node may comprise a base station such as a gNB. The network node may be configured to provide various traffics (e.g., a unicast traffic, a multicast traffic, etc.) to one or more terminal devices such as UEs.

According to the exemplary method 400 illustrated in FIG. 4, the network node may transmit an uplink resource indicator for a multicast traffic of the terminal device to the terminal device (e.g. the terminal device as described with respect to FIG. 3), as shown in block 402. In accordance with an exemplary embodiment, the uplink resource indicator (e.g. an ARI included in a PDCCH for the multicast traffic, etc.) may be used to indicate different uplink resources for multicast feedback of different terminal devices in a multicast group receiving the multicast traffic. According to an uplink resource indicated to the terminal device by the uplink resource indicator, the network node may receive multicast feedback of the terminal device for the multicast traffic from the terminal device, as shown in block 404.

It can be appreciated that the steps, operations and related configurations of the method 400 illustrated in FIG. 4 may correspond to the steps, operations and related configurations of the method 300 illustrated in FIG. 3. Thus, the uplink resource indicator received by the terminal device according to the method 300 may correspond to the uplink resource indicator transmitted by the network node according to the method 400. Similarly, the uplink resource(s) indicated by the uplink resource indicator according to the method 300 may correspond to the uplink resource(s) indicated by the uplink resource indicator according to the method 400.

In accordance with an exemplary embodiment, the different uplink resources indicated by the uplink resource indicator may be at least part of a set of uplink control channel resources, e.g. PUCCH resources. This set of uplink control channel resources may be shared by the different terminal devices in the multicast group, and optionally shared between unicast and multicast feedback transmissions.

In accordance with an exemplary embodiment, the network node may transmit information about the set of uplink control channel resources to the terminal device (e.g. in RRC signaling, etc.) to indicate indexes assigned to the set of uplink control channel resources with respect to the terminal device. According to an exemplary embodiment, for each terminal device in the multicast group, the network node may transmit different information about the set of uplink control channel resources (e.g. in the corresponding RRC signaling, etc.) to indicate indexes assigned to the set of uplink control channel resources with respect to the corresponding terminal device.

Various exemplary embodiments according to the present disclosure may enable a UE in a multicast group to share a PUCCH resource pool with other UEs in the multicast group, and send HARQ feedback to a network node (e.g. gNB) without a PUCCH resource confliction with the other UEs in the multicast group. In accordance with an exemplary embodiment, the network node may implement smart configuration of the PUCCH resource pool that may be shared by all UEs in the multicast group, so that the same PUCCH resource index (e.g. an ARI in DCI) may point to different physical PUCCH resources for each UE in the multicast group. This can ensure that all UEs in the multicast group may have their respective PUCCH resources to send multicast HARQ feedback, even if there may be only one ARI in the DCI for the multicast feedback. Application of various exemplary embodiments can support transmission of multicast HARQ feedback from UEs in a multicast group in a more flexible and efficient way, so as to enhance network performance with improved resource utilization.

The various blocks shown in FIGS. 3-4 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
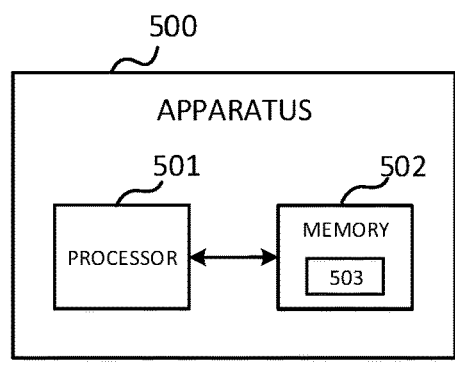
FIG. 5 is a block diagram illustrating an apparatus according to an embodiment of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a terminal device as described with respect to FIG. 3, or a network node as described with respect to FIG. 4. In such cases, the apparatus 500 may be implemented as a terminal device as described with respect to FIG. 3, or a network node as described with respect to FIG. 4.

In some implementations, the one or more memories 502 and the computer program codes 503 may be configured to, with the one or more processors 501, cause the apparatus 500 at least to perform any operation of the method as described in connection with FIG. 3. In other implementations, the one or more memories 502 and the computer program codes 503 may be configured to, with the one or more processors 501, cause the apparatus 500 at least to perform any operation of the method as described in connection with FIG. 4. Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6A:
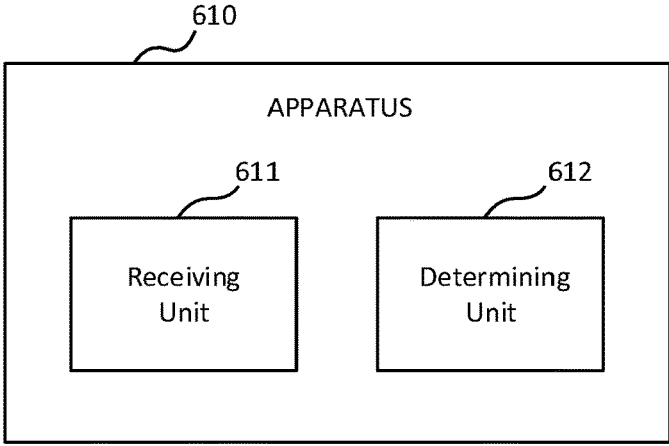
FIGS. 6A-6B are block diagrams illustrating apparatuses according to some embodiments of the present disclosure.

FIG. 6A is a block diagram illustrating an apparatus 610 according to some embodiments of the present disclosure. As shown in FIG. 6A, the apparatus 610 may comprise a receiving unit 611 and a determining unit 612. In an exemplary embodiment, the apparatus 610 may be implemented in a terminal device such as a UE. The receiving unit 611 may be operable to carry out the operation in block 302, and the determining unit 612 may be operable to carry out the operation in block 304. Optionally, the receiving unit 611 and/or the determining unit 612 may be operable to carry out more or less operations to implement the proposed methods according to the exemplary embodiments of the present disclosure.

Figure 6B:
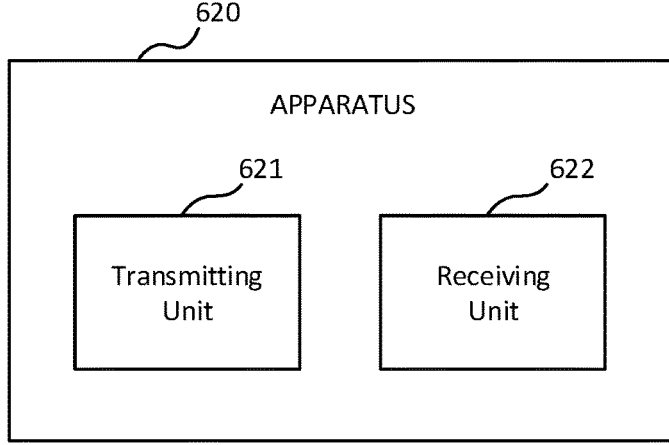

FIG. 6B is a block diagram illustrating an apparatus 620 according to some embodiments of the present disclosure. As shown in FIG. 6B, the apparatus 620 may comprise a transmitting unit 621 and a receiving unit 622. In an exemplary embodiment, the apparatus 620 may be implemented in a network node such as a base station. The transmitting unit 621 may be operable to carry out the operation in block 402, and the receiving unit 622 may be operable to carry out the operation in block 404. Optionally, the transmitting unit 621 and/or the receiving unit 622 may be operable to carry out more or less operations to implement the proposed methods according to the exemplary embodiments of the present disclosure.

Figure 7:
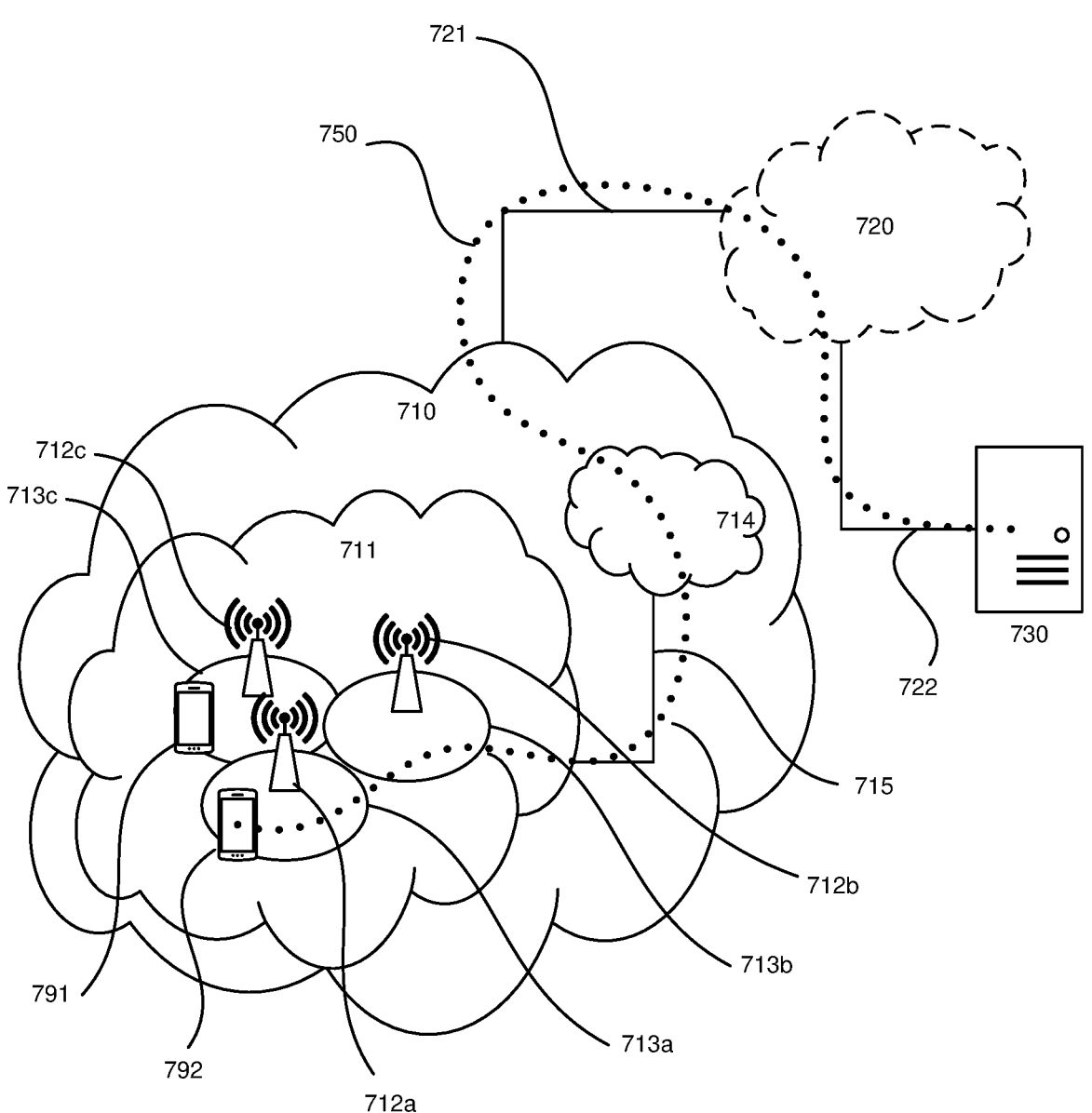
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more subnetworks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
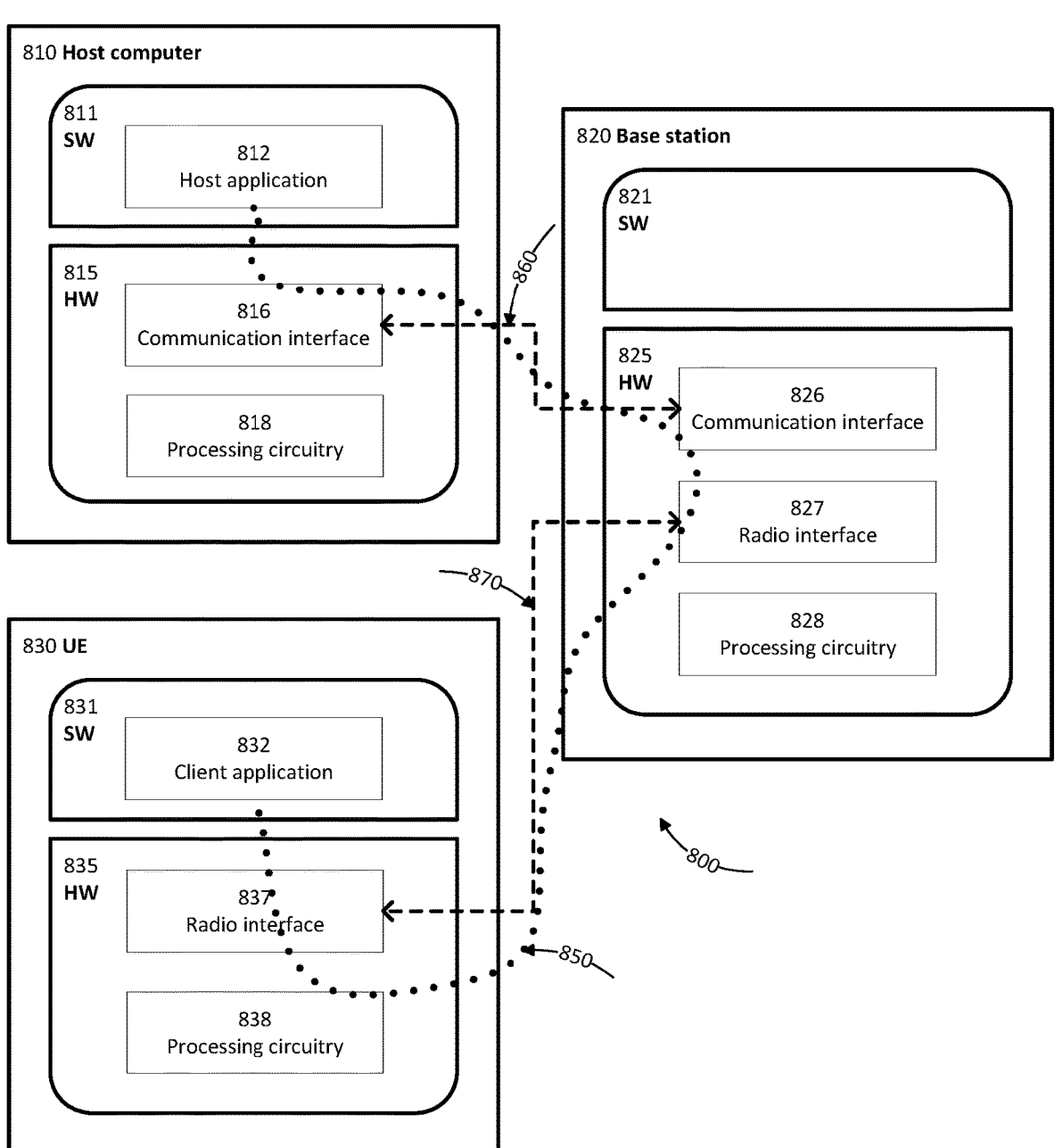
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown)

adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection

850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
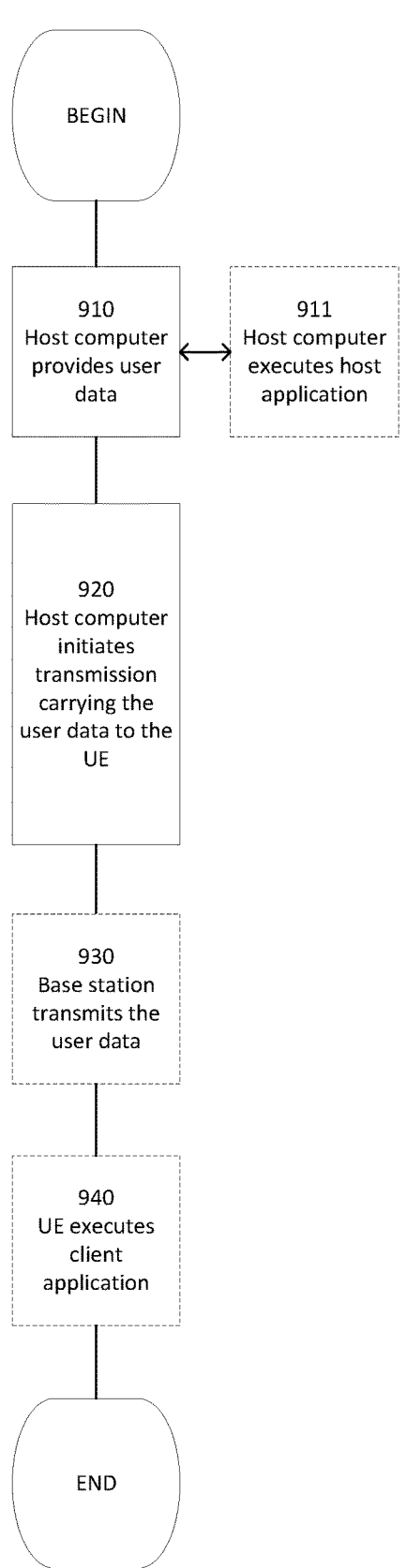
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
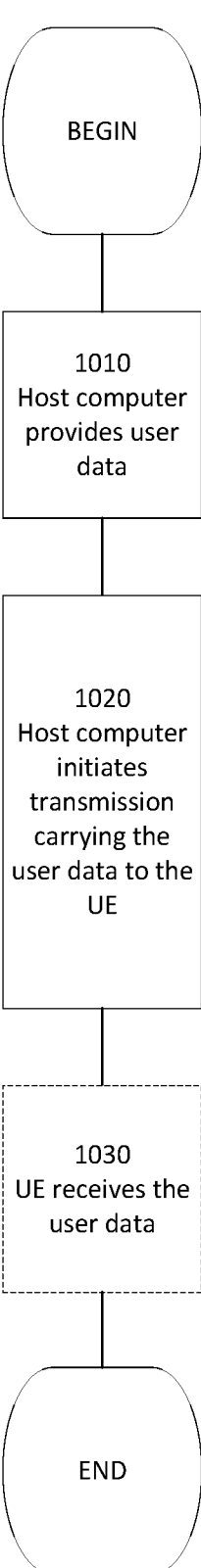
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
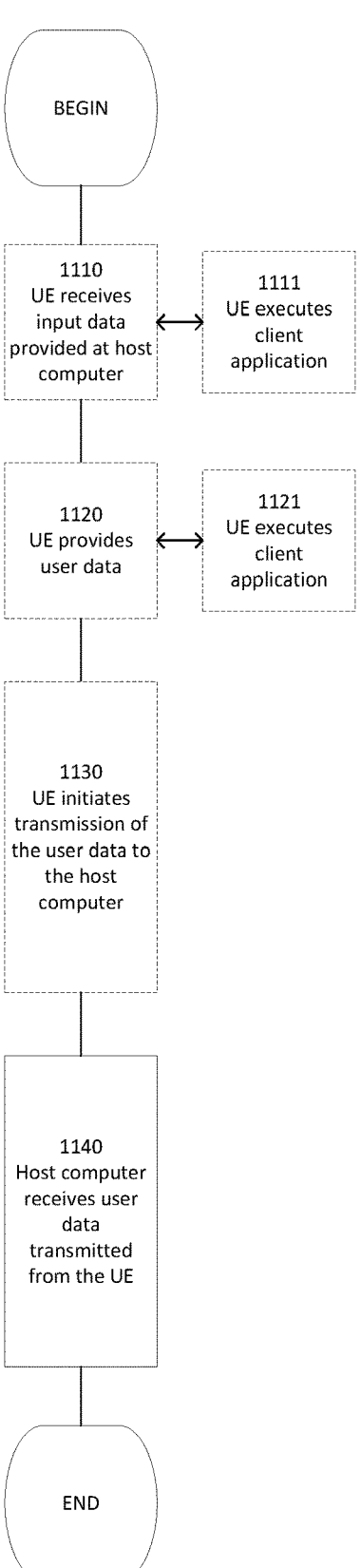
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
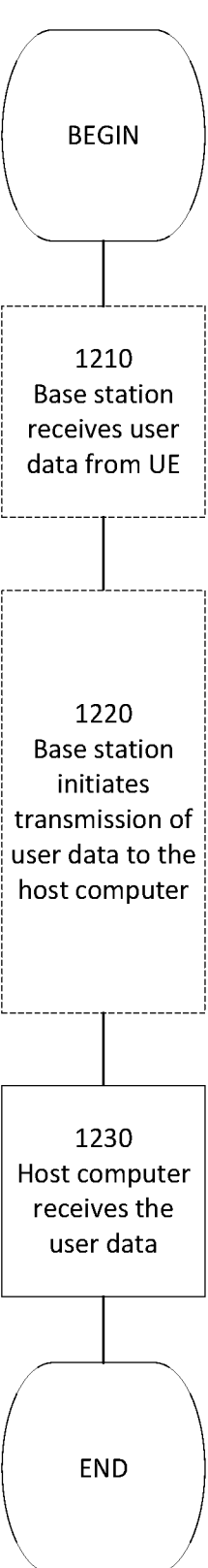
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 400 as describe with respect to FIG. 4.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 400 as describe with respect to FIG. 4.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 300 as describe with respect to FIG. 3.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 300 as describe with respect to FIG. 3.

According to some exemplary embodiments, there is provided a method implemented in a communication system which may include a host computer, a base station and a UE. The method may comprise, at the host computer, receiving user data transmitted to the base station from the UE which may perform any step of the exemplary method 300 as describe with respect to FIG. 3.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 300 as describe with respect to FIG. 3.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 400 as describe with respect to FIG. 4.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 400 as describe with respect to FIG. 4.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, comprising:

receiving an uplink resource indicator for a multicast traffic of the terminal device from a network node, wherein the uplink resource indicator is used to indicate different uplink resources for multicast feedback of different terminal devices in a multicast group receiving the multicast traffic; and determining an uplink resource for multicast feedback of the terminal device for the multicast traffic, according to the uplink resource indicator;

wherein the different uplink resources indicated by the uplink resource indicator are at least part of a set of uplink control channel resources which are sharable by the different terminal devices in the multicast group;

wherein the set of uplink control channel resources have indexes per resource, and different indexes are assigned to a same resource in the set of uplink control channel resources with respect to the different terminal devices in the multicast group.

2. The method according to claim 1, further comprising:

obtaining information about the set of uplink control channel resources to indicate indexes assigned to the set of uplink control channel resources with respect to the terminal device.

3. The method according to claim 2, wherein the information about the set of uplink control channel resources is included in radio resource control signaling from the network node.

4. The method according to claim 1, wherein the set of uplink control channel resources are also available for unicast feedback transmission.

5. The method according to claim 1, wherein the uplink resource indicator is reserved for the multicast traffic.

6. The method according to claim 1, wherein the uplink resource indicator is an acknowledgement resource indicator included in a downlink control channel for the multicast traffic.

7. The method according to claim 1, further comprising:

transmitting the multicast feedback of the terminal device to the network node, according to the determined uplink resource.

8. A terminal device, comprising:

one or more processors; and one or more memories comprising computer program codes, the one or more memories and the computer program codes configured to, with the one or more processors, cause the terminal device at least to:

receive an uplink resource indicator for a multicast traffic of the terminal device from a network node, wherein the uplink resource indicator is used to indicate different uplink resources for multicast feedback of different terminal devices in a multicast group receiving the multicast traffic; and determine an uplink resource for multicast feedback of the terminal device for the multicast traffic, according to the uplink resource indicator;

wherein the different uplink resources indicated by the uplink resource indicator are at least part of a set of uplink control channel resources which are sharable by the different terminal devices in the multicast group;

wherein the set of uplink control channel resources have indexes per resource, and different indexes are assigned to a same resource in the set of uplink control channel resources with respect to the different terminal devices in the multicast group.

9. A method performed by a network node, comprising:

transmitting an uplink resource indicator for a multicast traffic of the terminal device to the terminal device, wherein the uplink resource indicator is used to indicate different uplink resources for multicast feedback of different terminal devices in a multicast group receiving the multicast traffic; and receiving multicast feedback of the terminal device for the multicast traffic from the terminal device, according to an uplink resource indicated to the terminal device by the uplink resource indicator;

wherein the different uplink resources indicated by the uplink resource indicator are at least part of a set of uplink control channel resources which are sharable by the different terminal devices in the multicast group;

wherein the set of uplink control channel resources have indexes per resource, and different indexes are assigned to a same resource in the set of uplink control channel resources with respect to the different terminal devices in the multicast group.

10. The method according to claim 9, further comprising:

transmitting information about the set of uplink control channel resources to the terminal device to indicate indexes assigned to the set of uplink control channel resources with respect to the terminal device.

11. The method according to claim 10, wherein the information about the set of uplink control channel resources is included in radio resource control signaling from the network node.

12. The method according to claim 9, wherein the set of uplink control channel resources are also available for unicast feedback transmission.

13. The method according to claim 9, wherein the uplink resource indicator is reserved for the multicast traffic.

14. The method according to claim 9, wherein the uplink resource indicator is an acknowledgement resource indicator included in a downlink control channel for the multicast traffic.

15. A network node, comprising:

one or more processors; and one or more memories comprising computer program codes, the one or more memories and the computer program codes configured to, with the one or more processors, cause the network node at least to:

transmit an uplink resource indicator for a multicast traffic of the terminal device to the terminal device, wherein the uplink resource indicator is used to indicate different uplink resources for multicast feedback of different terminal devices in a multicast group receiving the multicast traffic; and receive multicast feedback of the terminal device for the multicast traffic from the terminal device, according to an uplink resource indicated to the terminal device by the uplink resource indicator;

wherein the different uplink resources indicated by the uplink resource indicator are at least part of a set of uplink control channel resources which are sharable by the different terminal devices in the multicast group;

wherein the set of uplink control channel resources have indexes per resource, and different indexes are assigned to a same resource in the set of uplink control channel resources with respect to the different terminal devices in the multicast group.

\* \* \* \* \*